(No Model.) 3 Sheets—Sheet 1.
J. M. HARRIS.
FILTER.
No. 579,232. Patented Mar. 23, 1897.
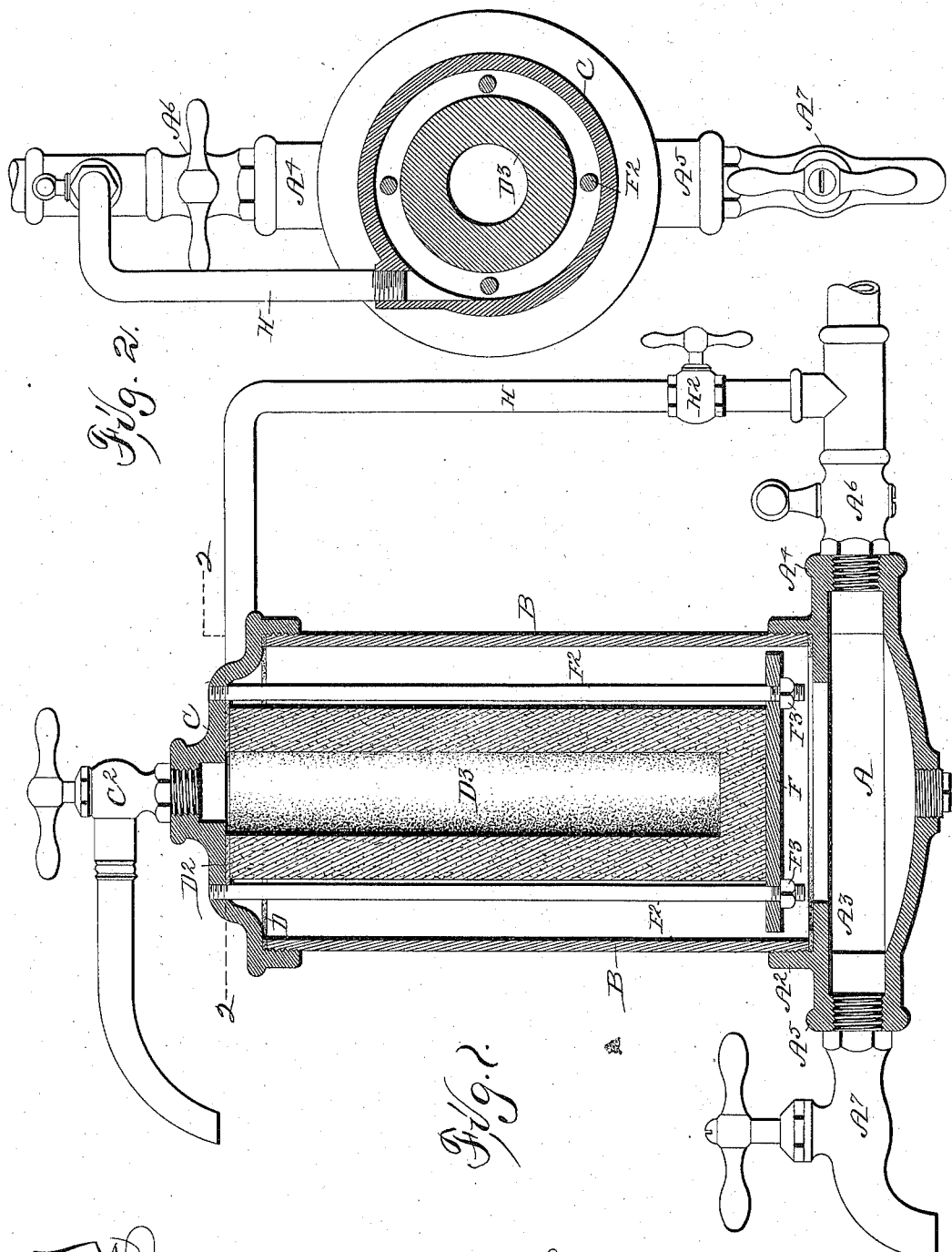

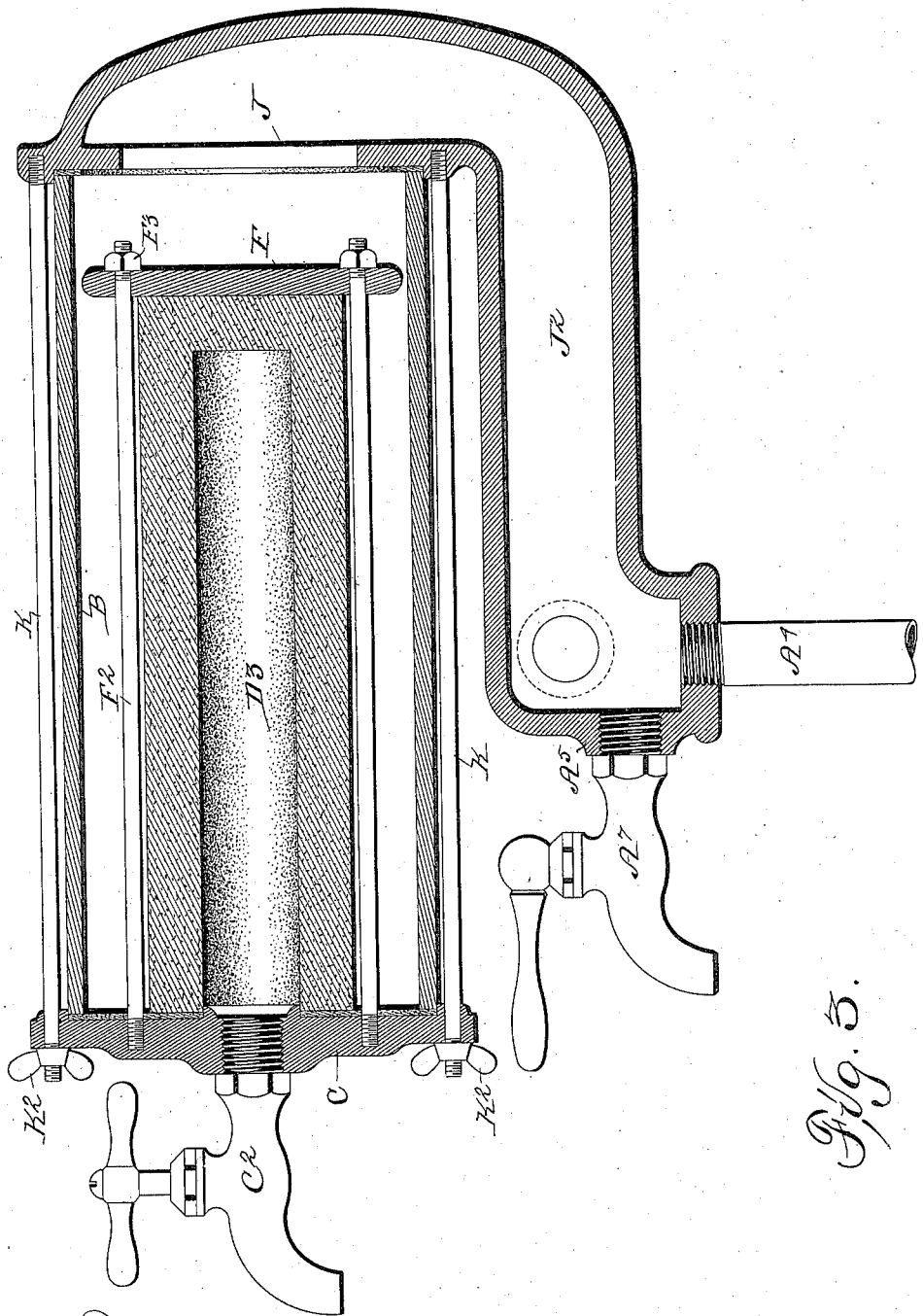

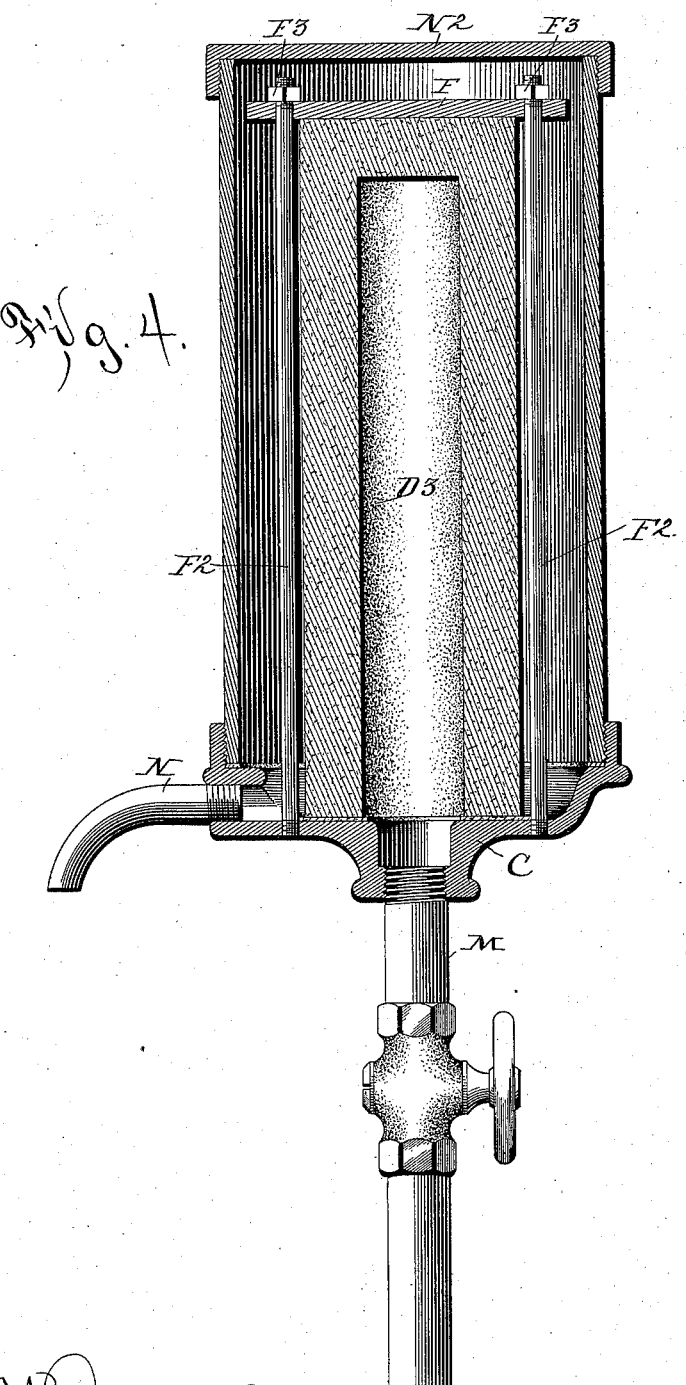

UNITED STATES PATENT OFFICE.

JAMES M. HARRIS, OF DES MOINES, IOWA.

FILTER.

SPECIFICATION forming part of Letters Patent No. 579,232, dated March 23, 1897.

Application filed October 12, 1896. Serial No. 608,679. (No model.)

*To all whom it may concern:*

Be it known that I, JAMES M. HARRIS, a citizen of the United States, residing at Des Moines, in the county of Polk and State of Iowa, have invented a new and useful Apparatus for Filtering Water, Oil, &c., of which the following is a specification.

The object of this invention is to provide a filtering apparatus in which all of the parts are of simple and inexpensive construction and easily assembled to produce the complete filter, and, further, to provide a filtering apparatus in which the filtering-stone will not be rapidly worn away even though water is forced against it under great pressure and in which the surface of the stone may be subjected to a strong stream of water to remove deposits therefrom, and to provide a filtering apparatus in which the filtering-stone may be easily and quickly detached and when in place be so held as to prevent leakage around its edges.

A further object is to provide a filtering apparatus that may readily and quickly be adapted for filtering oil.

My invention consists in certain details in the construction, arrangement, and combination of the various parts of the device and in the construction of the means for suspending the filtering-stone, as hereinafter set forth, pointed out in my claims, and illustrated in the accompanying drawings, in which—

Figure 1 shows a vertical sectional view of the complete apparatus. Fig. 2 shows a horizontal sectional view on line 2 2 of Fig. 1. Fig. 3 shows a vertical section of a modified form of the device. Fig. 4 shows a vertical sectional view of a modified form of the device adapted for filtering oil.

Referring to the accompanying drawings, the reference-letter A is used to indicate a cast-metal base, substantially cup-shaped in outline and having a circular screw-threaded rim $A^2$ at its top and a circular inwardly-projecting flange $A^3$ at the base of the said rim. At the opposite sides of the base the inflow and discharge pipes $A^4$ and $A^5$ are admitted. A valve $A^6$ is placed in the inflow-pipe and a cock $A^7$ on the discharge-pipe.

B indicates a pipe-section screwed into the rim $A^2$ and screw-threaded at its top.

C indicates a cap, preferably made of cast metal, designed to be screwed to the top of the pipe B. In its central portion is a cock $C^2$, through which filtered water is drawn.

A packing-ring D is placed on top of the pipe B to engage the under surface of the cap, and a smaller packing-ring $D^2$ is located on the under side of the cap to engage the filter-stone $D^3$. This stone is cylindrical in shape and has an opening extending from one end to a point near the other end. The open end is placed against the packing-ring $D^2$, and the stone is held in this suspended position by means of a plate F, placed on the bottom of the filter with its edges projecting beyond the sides of the filter. A series of rods $F^2$ are secured onto the cap C and extend through openings in the said plate. Nuts $F^3$ on the lower ends of the rods serve to clamp the plate to the stone and firmly hold the stone to its position against the cap.

By admitting the water first into a large cup-shaped base the force of the current is distributed and the impact of the current upon the lower end of the filter is minimized. The inwardly-projecting rim at the top of the base and the circular plate tend to spread out the current of water, so that it travels upwardly close to the interior of the pipe and does not strike the stone with any considerable force. Hence the stone is not worn irregularly, as is the case where a strong current of water is forced directly against the stone. It is obvious also that the stone may be easily and quickly detached or replaced and that there is no probability of leakage between the stone and cap.

I have provided means for cleaning the surface of the stone, as follows: H indicates a small pipe leading from the main supply-pipe and entering the cap C at a tangent, so that a current of water forced therethrough will strike the stone and pass spirally around it until it enters the base and passes out through the discharge-cock. A valve $H^2$ is placed in this pipe H, so that the flow of water may be controlled.

In the modified form of the device shown in Fig. 3 the filter is suspended in a horizontal position. The part corresponding to the base in the other form is in this form composed of a cast pipe having at its top a large circular opening at J in a vertical plane and a smaller pipe leading downwardly therefrom, then horizontally at J², and designed to receive a vertical supply-pipe. The pipe-section B is connected with the base by means of rods K, screwed into the base and passed through openings in the cap, with nuts K² on their ends. In other respects the two forms are about the same.

In the modification shown in Fig. 4 the device is adapted for filtering oil, and for this purpose I have taken all of the device except the base, inverted the same, so that the open end of the filter will be at its bottom, and placed an inflow-pipe M where the discharge-cock was on the other forms, so that oil is first introduced into the hollow of the stone to filter outwardly through the stone.

N indicates an outflow-pipe admitted into the base, and N² a cover fixed to the top of the pipe B. It is well known that the water usually found in oil to be filtered will remain in the bottom of the receptacle and that by admitting oil into the lower end of the filter the oil will first pass through the filter before the water reaches it, and when water has passed through the filter it will be drawn off before the oil, so that no water can lodge permanently in the pipe B around the filter, it being well known that oil will not pass through a filtering-stone when surrounded by water. This form of the device is also used in filtering extracts and other similar fluids and is of peculiar advantage for these purposes because the fluid is filtered as fast as it enters the stone and the entire chamber need not be filled before the fluid will begin to flow, and thus all of the fluid contained in a vessel may be passed through the filter.

Having thus described my invention, what I claim as new therein, and desire to secure by Letters Patent of the United States therefor, is—

1. A filtering apparatus, comprising a base, a supply-pipe leading into the base, a cylindrical inclosing frame secured to the base, a cap at its top having an outflow-pipe at its central portion, a packing-ring on the under side of the cap, a filter-stone having a central opening extending from its top to a point near its bottom, placed in position with said top resting on the packing-ring, a solid plate at the lower end of the stone with its edges projecting beyond the sides of the stone, and a number of rods secured to said cap and passed through the projecting edge of the plate, and nuts on the lower ends of the rods, substantially as and for the purposes stated.

2. A filtering apparatus comprising a cup-shaped base having an opening at its top, pipes of ingress and egress communicating with the base, a packing-ring to surround the opening at the top of the base, a pipe-section seated on said packing-ring, a cap having a central opening, a packing-ring thereon to engage the top of the pipe, a second packing-ring adjacent to the central opening, a cylindrical filtering-stone having an opening extending from one end to a point near the other end and placed on the packing-ring a plate at the lower end of the filter with its edges projecting beyond the sides of the filter to direct strong currents of water away from the filter, rods connecting the cap and plate, nuts on said rods and a cock in the cap to communicate with the opening in the filter, for the purposes stated.

3. A filtering apparatus, comprising a cup-shaped base having an opening at its top, pipes of ingress and egress communicating with the base, a packing-ring to surround the opening at the top of the base, a pipe-section seated on said packing-ring, a cap having a central opening, a packing-ring thereon to engage the top of the pipe, a second packing-ring adjacent to the central opening, a cylindrical filtering-stone having an opening extending from one end to a point near the other end and placed on the packing-ring, a plate at the lower end of the filter, rods connecting the cap and plate, nuts on said rods and a cock in the cap to communicate with the opening in the filter, a pipe leading from the supply-pipe to enter the filtering-chamber near its top and at a tangent and a valve in said pipe, for the purposes stated.

4. In a filter, the combination of a substantially cup-shaped base, an inwardly-projecting flange at its open end a cylinder secured to the base, a filtering-stone supported in the cylinder and a plate secured to the end of the filtering-stone adjacent to said flange with its edges projecting beyond the sides of the filter to coact with said inwardly-projecting flange in preventing the impact of direct currents of water against the stone substantially as set forth.

JAMES M. HARRIS.

Witnesses:
J. RALPH ORWIG,
THOMAS G. ORWIG.